E. E. JULIAN.
TIRE.
APPLICATION FILED DEC. 24, 1920. RENEWED AUG. 12, 1922.
1,433,625.
Patented Oct. 31, 1922.
2 SHEETS—SHEET 2.
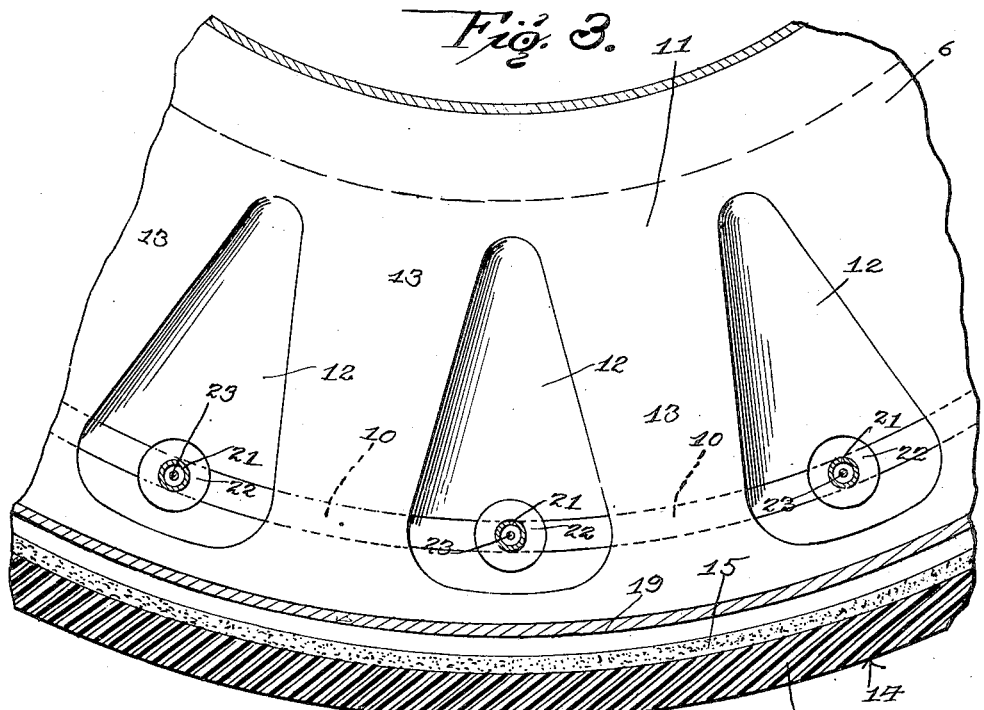
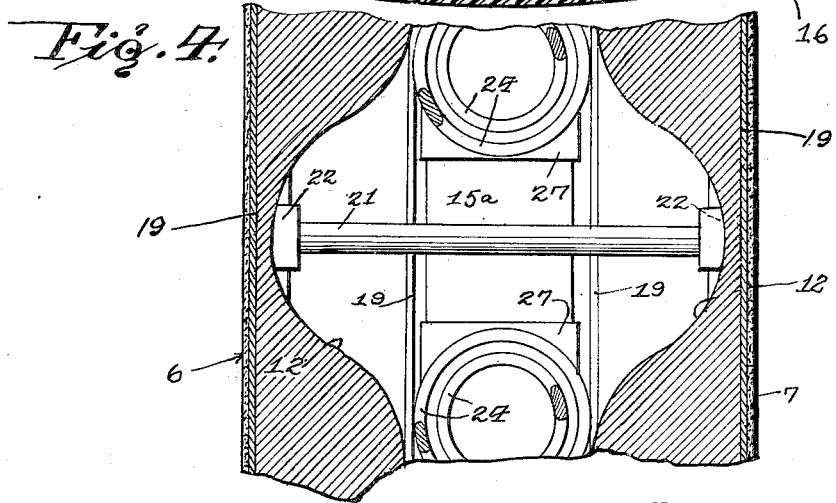
Earnest E Julian.
INVENTOR.
BY
Watson E Coleman
ATTORNEY.

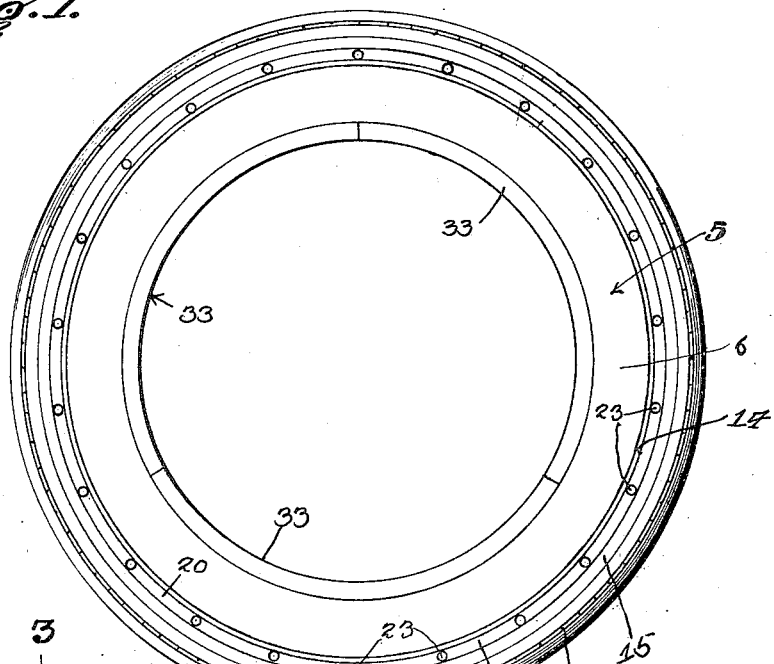

Patented Oct. 31, 1922.

1,433,625

UNITED STATES PATENT OFFICE.

EARNEST E. JULIAN, OF WICHITA, KANSAS, ASSIGNOR OF ONE-HALF TO WILLIAM T. SMITH, OF PROTECTION, KANSAS.

TIRE.

Application filed December 24, 1920, Serial No. 433,015. Renewed August 12, 1922. Serial No. 581,493.

*To all whom it may concern:*

Be it known that EARNEST E. JULIAN, a citizen of the United States, residing at Wichita, in the county of Sedgwick and State of Kansas, has invented certain new and useful Improvements in Tires, of which the following is a specification, reference being had to the accompanying drawings.

This invention relates to tires and has for its object to provide a tire capable of producing all of the cushioning features of a pneumatic tire without possessing any of the disadvantages of a pneumatic tire.

Another object is to provide a tire of this character which responds to the irregularities in the path of travel to properly cushion the vehicle and at the same time provides a tire possessing the strength of a solid rubber tire.

Another object is to provide a tire of this character including substantial side walls made of non-flexible material and a tread member made of flexible material and means for connecting the tread member to the side walls and the side walls to each other.

A still further object of the invention is to provide a tire of this character including a detachable tread member, the portion of the tread member extending between the side walls being supported by springs which also extend between the side walls.

With the above and other objects in view, the invention consists in the improved construction and arrangement of parts to be hereinafter more particularly described, fully claimed and illustrated in the accompanying drawings, in which:—

Figure 1 is a side elevation of a tire constructed in accordance with an embodiment of the invention.

Figure 2 is a transverse sectional view.

Figure 3 is a section taken on the line 3—3 of Figure 2.

Figure 4 is a section taken on the line 4—4 of Figure 2, and

Figure 5 is a sectional view of a tread member.

Referring to the drawings, 5 designates a tire comprising side walls 6 and 7. Each wall is constructed preferably of metal or like substantial material, the outer surface of the walls being arranged to assimilate the side walls of a tire casing. A stepped annular channel 10 is provided in the outer side of each wall, the purpose of which will be hereinafter described. The inner side 11 of the wall is provided with a plurality of spaced recesses 12, a portion of the channel 10 extending inwardly and across the recesses 12 in each of the walls 6 and 7. By this means, supports 13 are provided which efficiently brace the wall and at the same time access may be had to the inner wall of the channel 10.

In connection with the substantially rigid walls 6 and 7 a novel form of tread member 14 is used, said tread member being substantially concavo convex in cross section and comprising a fiber casing 15 having a central projection 15ª. A lamination of rubber 16 is secured to the outer surface of the casing 15, and is provided with channels 16ª. The lamination of rubber is relatively thick especially at the tread portion thereof, and gradually tapers toward each side until it merges with the marginal edges of the casing 15. These marginal edges of the casing are provided with inwardly projecting ribs 17, a recess 18 being provided in the outer portion of each of the marginal edges, said recess extending inwardly and terminating within the rib 17. Annular metal plates 19 are disposed inwardly of the casing 15 each having a recess 19ª formed in each marginal edge, the rear wall of said recess extending into the channel 10. The inner marginal edges of the plates terminate adjacent the central projection 15ª of the casing 15, and serve to protect the casing as well as properly support the walls 6 and 7, the stepped portion of the channels 10 permitting the tread portion to lie flush with the outer surface of the walls 6 and 7. A metal band 19ᵇ extends around the tire on each side thereof and is embedded in the casing 15, fastening means 19ᶜ extending through the casing 15 and the plates 19 to secure the plates to the casing 15. It will be noted that the intermediate portion of the tread member on both sides of the projection 15ᵃ is spaced from the lower surface of the plates 19 so as to prevent interference with the flexing of the intermediate portion of the tread member. It is of course obvious that the plates 19 are of sufficient strength to support the lower portions of the walls so as to relieve the intermediate portion of the casing from the burden of supporting the walls and to permit said casing to flex with the rubber lamination.

A metal band 20 is disposed in each of the recesses 18, said band having openings registering with openings formed in the recesses and with similar openings formed in the opposite walls. Sleeves 21 having a socket member 22 on each end are disposed inwardly of the tire and are arranged to engage the inner projecting portions caused by the channels 10. By this means the walls 6 and 7 are held in spaced relation to each other. Bolts 23 are extended through the registering openings of the bands 20, and walls of the channels and sleeves whereby the tread member, and the walls 6 and 7 are efficiently connected to each other, by the same fastening means.

It is of course obvious that as the side walls 6 and 7 are disposed in spaced relation to each other that the intermediate portion of the tread member is unsupported. To support and permit said portion of the tread member to readily flex in the cushioning operation, a plurality of double springs 24 are provided. In this way every part of the intermediate portion of the tread is yieldably supported. Each spring has its end 25 keyed in lugs 26 which project from a supporting plate 27. This plate is secured to the intermediate portion of the tread by means of bolts 28 which are connected to plates 28ᵃ embedded in the casing 15. The end 29 of the spring is likewise keyed in lugs 30 which project from rim plates 31, each plate having flanges 32 adapted to engage the inner surface of the edges 8 of the side walls 6 and 7, to maintain said edges in the proper spaced relation. The edges 8 together with the rim plates 31 are intended to be disposed within rim plates 33. A plurality of bolts or screws 34 are then passed through the rim plates 33 and the spring rim plates 31. A plurality of bolts 35 are also passed through the flanges of the plates 33, edges 8 of the walls and flanges 32 of the supporting plates 31 after the tire has been assembled. The rim plates 33 and supporting plates 31 are formed in several sections so as to facilitate application and removal.

In assembling the tire, the walls 6 and 7 are disposed inwardly of the tread so as to permit the ribs formed by the recesses 18 and 19ᵃ to enter the channels 10. The sleeves 21 are then disposed in engagement with the inner walls of the recesses. The metal bands 20 are then applied and the bolts extended through the sleeves 21. By this means the tread member is firmly secured to the side walls and the side walls connected and maintained in the proper position through the medium of the sleeves 21. It is of course obvious that the sleeves extend between the springs 24 so as to prevent interference with the movement of the springs. The plates 31 are then connected to the rim plates 33 and the marginal edges 8 of the side walls. The tire may then be applied in the well known manner.

From the foregoing it will be readily seen that this invention provides a novel form of tire which is capable of responding to all of the irregularities encountered in the course of travel to efficiently absorb shocks and cushion the vehicle properly. These advantages are possessed by a tire which does not use air for inflation, and wherein the tread member may be punctured by any object and frequently, without danger of interfering with the function of the tire or its cushioning operation. Should any parts of the tire become damaged or worn, the tire may be readily disassembled by an inexperienced person as its construction is simple.

What is claimed is:

1. A tire of the character described comprising non-flexible opposed walls, a flexible tread member embracing a marginal edge portion of each wall, sectional tire rims detachably connecting the opposite edges of the walls to each other, and means engaged with the rims and the tread member for yieldably supporting the tread member.

2. A tire of the character described comprising non-flexible opposed walls, each wall having annular spaced recesses, a flexible tread member embracing corresponding edges of the walls, means yieldably supporting the intermediate portion of the tread member, means detachably connecting the walls to each other and the tread member to the walls, said means comprising a plurality of sleeves extending laterally of the tire and between the walls into opposed recesses of said walls and fastening means in each sleeve, the ends of the fastening means engaging the tread member.

3. A tire of the character described comprising opposed annular walls, the outer marginal edge of each wall having a stepped channel, a wall of said channel having spaced openings, sleeves extending between the walls, the ends of said sleeves substantially registering with the openings in the walls, a tread member having annular ribs inwardly of the edges of said tread member, said ribs being insertible in the channels of the walls, rods extending through said sleeves and connected to the tread member, spaced plates carried by the tread member, springs secured at one of their ends to the plates, the opposite ends of the springs extending between the walls, plates secured to the last mentioned ends of the springs, a plurality of rim plates disposed in engagement with the inner marginal edges of the walls and the last mentioned plates, and fastening means for securing said rim plates to the walls and the last mentioned plates.

In testimony whereof I hereunto affix my signature.

EARNEST E. JULIAN.